United States Patent
Gretzer et al.

(10) Patent No.: US 11,721,827 B2
(45) Date of Patent: *Aug. 8, 2023

(54) FUEL CELL DEVICE

(71) Applicant: AUDI AG, Ingolstadt (DE)

(72) Inventors: Markus Gretzer, Eichstätt (DE); Norbert Kluy, Schernfeld (DE)

(73) Assignee: Audi AG, Ingolstadt (DE)

( * ) Notice: Subject to any disclaimer, the term of this patent is extended or adjusted under 35 U.S.C. 154(b) by 155 days.

This patent is subject to a terminal disclaimer.

(21) Appl. No.: 17/293,006

(22) PCT Filed: Nov. 4, 2019

(86) PCT No.: PCT/EP2019/080049
§ 371 (c)(1),
(2) Date: May 11, 2021

(87) PCT Pub. No.: WO2020/099161
PCT Pub. Date: May 22, 2020

(65) Prior Publication Data
US 2021/0408571 A1 Dec. 30, 2021

(30) Foreign Application Priority Data
Nov. 12, 2018 (DE) ...................... 10 2018 219 201.4

(51) Int. Cl.
*H01M 8/2484* (2016.01)
*H01M 8/0258* (2016.01)
(Continued)

(52) U.S. Cl.
CPC ....... *H01M 8/2484* (2016.02); *H01M 8/0258* (2013.01); *H01M 8/04044* (2013.01);
(Continued)

(58) Field of Classification Search
CPC ............ H01M 8/2484; H01M 8/0258; H01M 8/04044; H01M 8/04126; H01M 8/04164; H01M 8/0687
See application file for complete search history.

(56) References Cited

U.S. PATENT DOCUMENTS

2004/0048136 A1* 3/2004 Grasso ................ H01M 8/2485
  204/267
2009/0226795 A1    9/2009 Chen et al.
(Continued)

FOREIGN PATENT DOCUMENTS

DE       10315601 A1    10/2004
DE    102004013689 A1   11/2005
(Continued)

OTHER PUBLICATIONS

Machine Translation of JP-61088464-A (Mar. 2, 2023) (Year: 2023).*
(Continued)

*Primary Examiner* — Matthew J Merkling
(74) *Attorney, Agent, or Firm* — Seed Intellectual Property Law Group LLP

(57) ABSTRACT

A fuel cell device comprises a fuel cell stack which is formed from a plurality of unit cells stacked one above the other in a stacking direction, each unit cell having one or more media channels and a membrane electrode assembly that comprises a cathode, an anode, and a membrane arranged between the cathode and the anode, and comprising a media duct running substantially parallel to the stacking direction. The media duct is connected or can be connected to the fuel cell stack to conduct a medium into or out of the media channels of the unit cells of the fuel cell stack substantially laterally to the stacking direction. The media duct is formed as a functional component or such a functional component is integrated therein, which is formed (Continued)

to pre-treat the medium before it enters the media channels or to post-treat the medium after it has exited the media channels.

9 Claims, 12 Drawing Sheets

(51) Int. Cl.
    *H01M 8/04044*     (2016.01)
    *H01M 8/04119*     (2016.01)
    *H01M 8/0662*     (2016.01)

(52) U.S. Cl.
    CPC ... *H01M 8/04126* (2013.01); *H01M 8/04164* (2013.01); *H01M 8/0687* (2013.01)

(56) References Cited

U.S. PATENT DOCUMENTS

| | | | |
|---|---|---|---|
| 2011/0076588 A1 | 3/2011 | Yamaura | |
| 2012/0315563 A1 | 12/2012 | Na et al. | |
| 2015/0132673 A1 | 5/2015 | Hood | |
| 2020/0280078 A1* | 9/2020 | Gretzer | H01M 8/0273 |

FOREIGN PATENT DOCUMENTS

| | | | |
|---|---|---|---|
| DE | 102010011206 A1 | 9/2011 | |
| DE | 102017219272 A1 | 6/2018 | |
| EP | 0981175 A2 * | 2/2000 | |
| EP | 1777770 A1 | 4/2007 | |
| EP | 1836739 B1 | 4/2015 | |
| JP | 61088464 A * | 5/1986 | ........ H01M 8/04104 |
| JP | 3-25862 A | 2/1991 | |
| JP | 2000-133291 A | 5/2000 | |
| JP | 2002-42833 A | 2/2002 | |
| JP | 2005-71959 A | 3/2005 | |
| JP | 2008-41475 A | 2/2008 | |
| JP | 2014-183010 A | 9/2014 | |
| JP | 2018-174066 A | 11/2018 | |
| KR | 10-2005-0084113 A | 8/2005 | |

OTHER PUBLICATIONS

International Search Report dated Feb. 10, 2020, for International Patent Application No. PCT/EP2019/080049. (2 pages).
German Search Report and Written Opinion, dated Oct. 15, 2019, for German Application No. DE 10 2018 219 201.4. (12 pages).
International Preliminary Report on Patentability, dated Jul. 10, 2020, for International Application No. PCT/EP2019/080049. (5 pages).

* cited by examiner

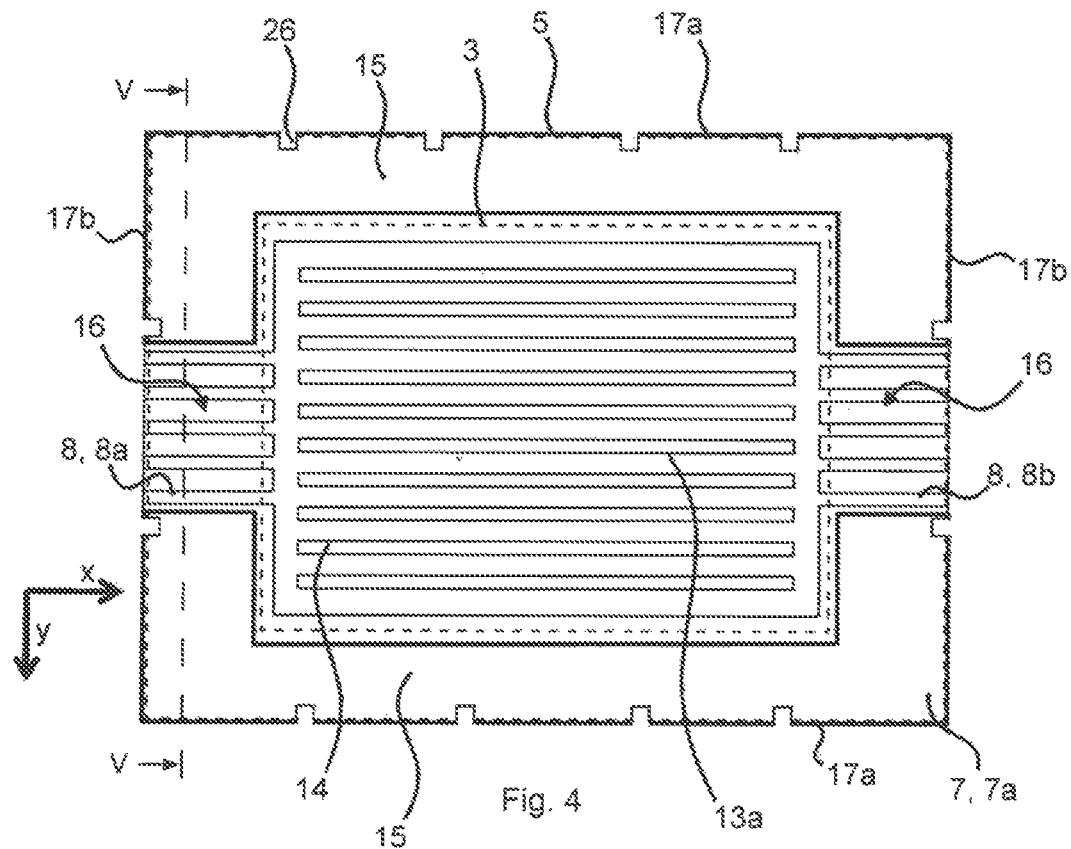
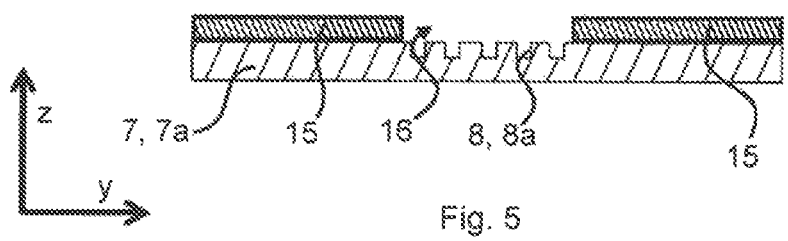

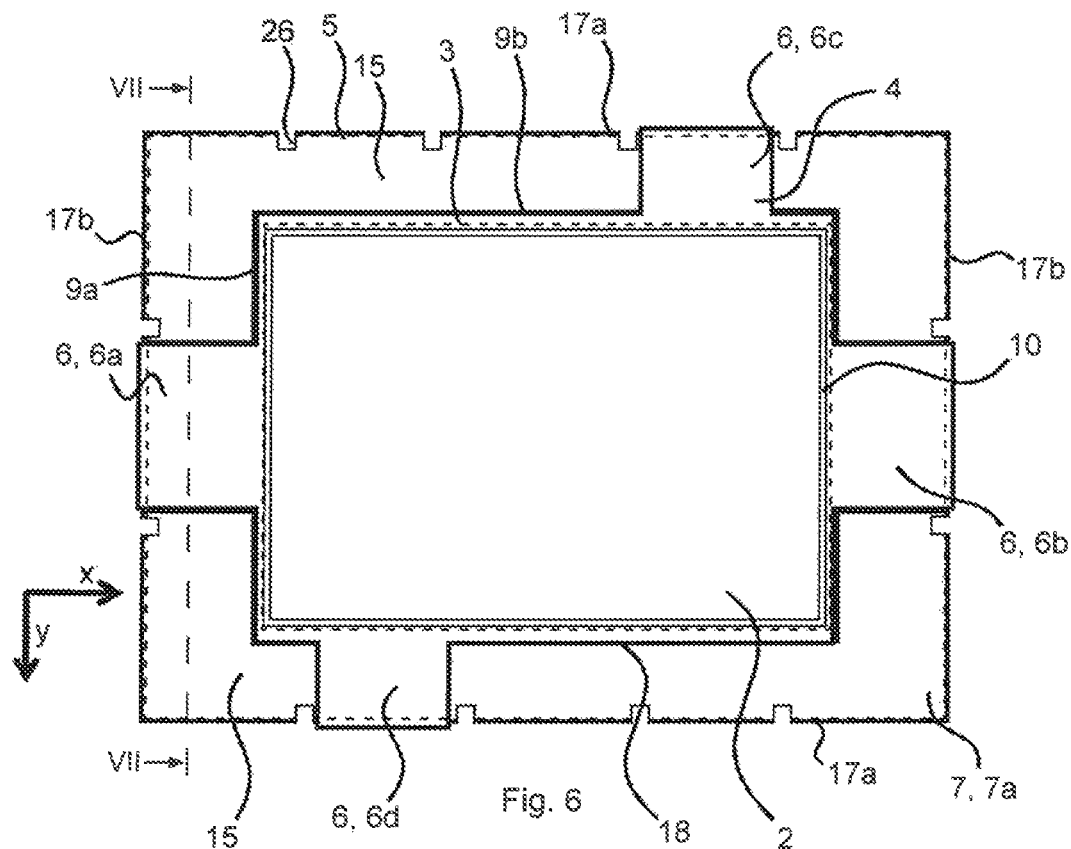
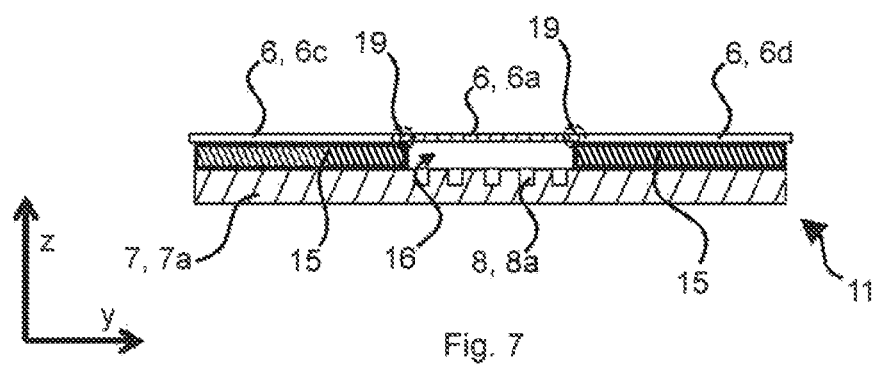

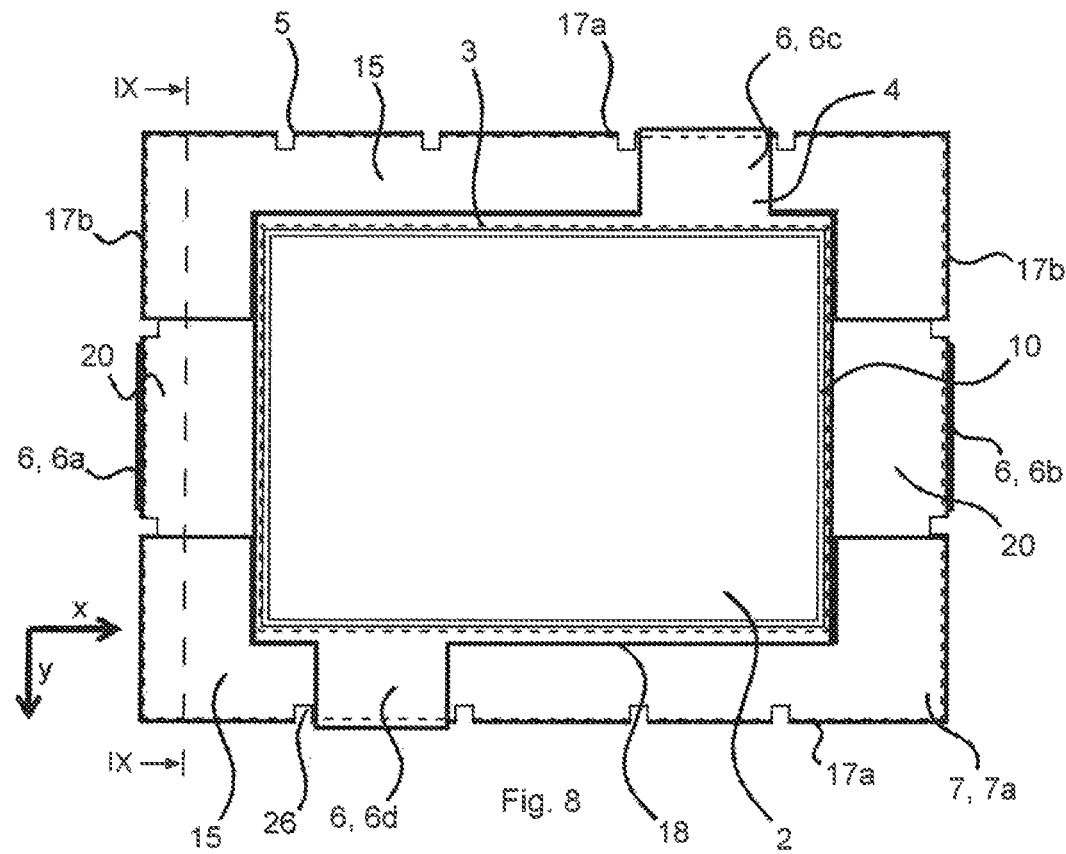
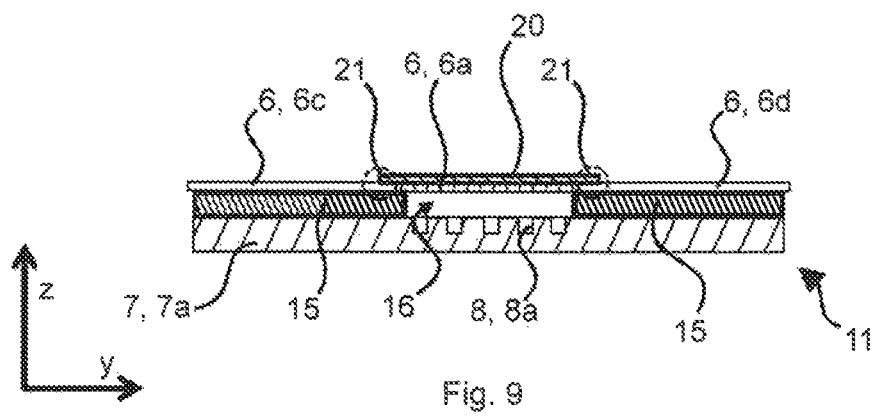

FUEL CELL DEVICE

BACKGROUND

Technical Field

Embodiments of the invention relate to a fuel cell device comprising a fuel cell stack which is formed from a plurality of unit cells stacked one above the other in a stacking direction which unit cell in each case has one or more media channels and a membrane electrode assembly which comprises a cathode, an anode and a membrane arranged between the cathode and the anode, and a media duct running substantially parallel to the stacking direction, especially externally with respect to the stack, and which is connected or can be connected to the fuel cell stack so as to conduct a medium into or out of the media channels of the unit cells of the fuel cell stack substantially laterally to the stacking direction.

Description of the Related Art

Fuel cell devices comprising media ducts externally with respect to the stack are known, for example, from US 2009/0226795 A1, JP 2005 071 959 A, EP 1 836 739 B1 or DE 10 2010 011 206 A1. DE 103 15 601 A1 shows a fuel cell device in which the media ducts are attached externally with respect to the fuel cell stacks.

BRIEF SUMMARY

A fuel cell device as described herein has a compact design with limited installation space.

The fuel cell device is characterized in that the media duct is formed as a functional component or such functional component is integrated therein, which is designed to pre-treat the medium before it enters the media channels, or to post-treat the medium after it has exited the media channels. This means that the functional component for the treatment of the medium is not arranged separately, but formed directly in the media ducts or assigned to the media ducts. This results in a significant saving in the space required by the fuel cell device. In addition, there is a reduced number of components.

The media ducts, the so-called external headers, are produced separately from the rest of the stack and are only connected to the stack after it has been completed. The geometry of the functional component can thus be chosen independently of the geometry of the stack, while in addition the possibility is opened up to choose the supply or discharge of the media in the functional component regardless of the stacking direction.

The functional component may be selected from a group comprising a humidifier, an ion exchanger, an ion trap, a particulate filter, an air filter, and a water separator.

A simple to manufacture fuel cell device is characterized in that several of the media ducts are provided that are formed as a first media supply for supplying air and as a first media discharge for discharging the at least partially consumed air, and that are formed as a second media supply for supplying a fuel and as a second media discharge for discharging the at least partially consumed fuel of the fuel cell stack. Thus, the two reaction media are conducted laterally along the fuel cell stack, i.e., externally with respect to the stack, in the media ducts, wherein they can enter into or exit from the unit cells of the fuel cell stack perpendicular to the stacking direction, that is to say, laterally.

In order to be able to adjust the moisture content in the fuel cell stack, the first media supply may be formed as a humidifier or such a humidifier may be integrated therein.

In order not to output any contaminations to the environment, the possibility is opened up that the first media discharge is formed as an air filter or such an air filter is integrated therein.

In order to also protect the fuel cell stack from contamination, it is useful when the second media supply is formed as a particle filter or such a particle filter is integrated therein.

In order to collect condensate accumulating in the anode circuit, the second media discharge is formed as a water separator or such a water separator is integrated therein.

To conduct a coolant additionally externally with respect to the stack along the fuel cell stack, and to conduct the coolant laterally into the unit cells or between two unit cells into the fuel cell stack, it is useful to subdivide the media ducts also into a coolant supply and a coolant discharge.

This opens up the possibility that the coolant supply is formed as an ion exchanger or such an ion exchanger is integrated therein. This ensures that the coolant supplied to the fuel cell stack is electrically neutral or below a critical conductivity value to avoid short circuits or electrical charging of components.

In order to facilitate the assembly of the fuel cell device, the fuel cell stack, such as the unit cells, has flange receptacles which are designed to receive a respective duct flange of the media ducts, the duct flanges being connected directly to one another.

In this case, the duct flanges of the media duct are inserted in flange receptacles of the fuel cell stack running substantially parallel to the stacking direction.

The duct flanges of the media ducts can be positioned laterally at the fuel cell stack with a predetermined stop at the fuel cell stack. This reduces the effort to assemble the media ducts at the right place. In addition, the assembly time for assembling the media ducts is minimized due to the flange receptacles formed on the fuel cell stack.

Such an assembly is also advantageous because a different material can be selected for the media duct than for the unit cells or for the bipolar plates of the unit cells. Also, the number of the sealing tracks can be reduced that need to be made for sealing the media ducts. This also reduces the production complexity.

It has been found to be useful when the flange receptacles of the fuel cell stack are formed as grooves running substantially parallel to the stacking direction. Such grooves are very easy to manufacture from a manufacturing point of view.

Furthermore, the media duct may be formed to be elastically resilient in such a way that the duct flanges are held under a pre-load in the flange receptacles. By such a pre-load the media ducts can be fixed in a self-locking manner during assembly on the fuel cell stack, wherein, additionally, a firmly bonded connection of the duct flanges to the fuel cell stack can be formed, such as with its flange receptacles, to establish a fixed connection.

The restoring force may be directed outwards, because the pressure generated by the medium also causes an outwardly directed force on the duct flanges. Due to the summation of the force of the flowing medium and the restoring force given by the elasticity, an even tighter and therefore more secure connection of the media duct to the fuel cell stack is achieved.

An additional securing of the duct flanges within the flange receptacles can be achieved in that the flange receptacles have an undercut running substantially parallel to the stacking direction, which is formed in such a way that a duct member formed or arranged at the one and/or the other duct flange can be received therein.

In order to strengthen the fixation of the duct flanges additionally, the duct member can be received in the undercut in an interlocking manner.

In this context, it can also be useful if the duct member is formed from a different material than the duct flanges. For example, the duct member may be formed of a material with adhesive properties, so that optionally, in addition to an interlocking connection—in addition, there is adhesion of the duct member within the undercut and thus a firmly bonded connection is additionally formed.

Because of the pressure prevailing in the media duct or in fuel cell stack caused by the medium conveyed therein, the connection of the media duct to the fuel cell stack is faced with the challenge of maintaining leakproofness. To meet this requirement, it has proven to be useful when the duct member is also formed of a sealing material.

In one configuration of the media duct, the duct flanges are connected indirectly to each other via a duct crosspiece. In doing so, it can take the shape of a U with the open end of the "U" facing the fuel cell stack, and thus the media are conducted from the outside to the fuel cell stack. Thus, the media flow within the media ducts substantially parallel to the stacking direction. They get into the fuel cell stack in a lateral or sideward direction (x-y direction) with respect to the stacking direction (z direction).

Alternatively, the duct flanges can also be connected directly to each other, implementing a cross-sectionally C-shaped configuration of the media ducts with an open end of the "C" towards the fuel cell stack. Here, too, the media flow within the media ducts substantially parallel to the stacking direction and get into the fuel cell stack in a lateral or sideward direction with respect to the stacking direction.

BRIEF DESCRIPTION OF THE SEVERAL VIEWS OF THE DRAWINGS

Further advantages, features and details emerge from the claims, the following description and the drawings.

FIG. 4 shows the first bipolar plate of FIG. 2 with a composite layer applied, shown in a plan view.

FIG. 5 shows section V-V of FIG. 4 with the components in a non-compressed state.

FIG. 6 shows the first bipolar plate of FIG. 4 with a fuel cell assembly placed thereon.

FIG. 7 shows section VII-VII of FIG. 6 with the components in a non-compressed state.

FIG. 8 shows the configuration of FIG. 6 with an applied connecting layer.

FIG. 9 shows section IX-IX of FIG. 8 with the components in a non-compressed state.

DETAILED DESCRIPTION

It should be pointed out in advance that the dimensions, the proportions, and the scale of the illustrations shown are not fixed and can vary. In the sectional illustrations, the individual layers are shown in such a way that it is possible to understand in which mutual position and in which order the individual layers are stacked one above the other.

Figure 1A:
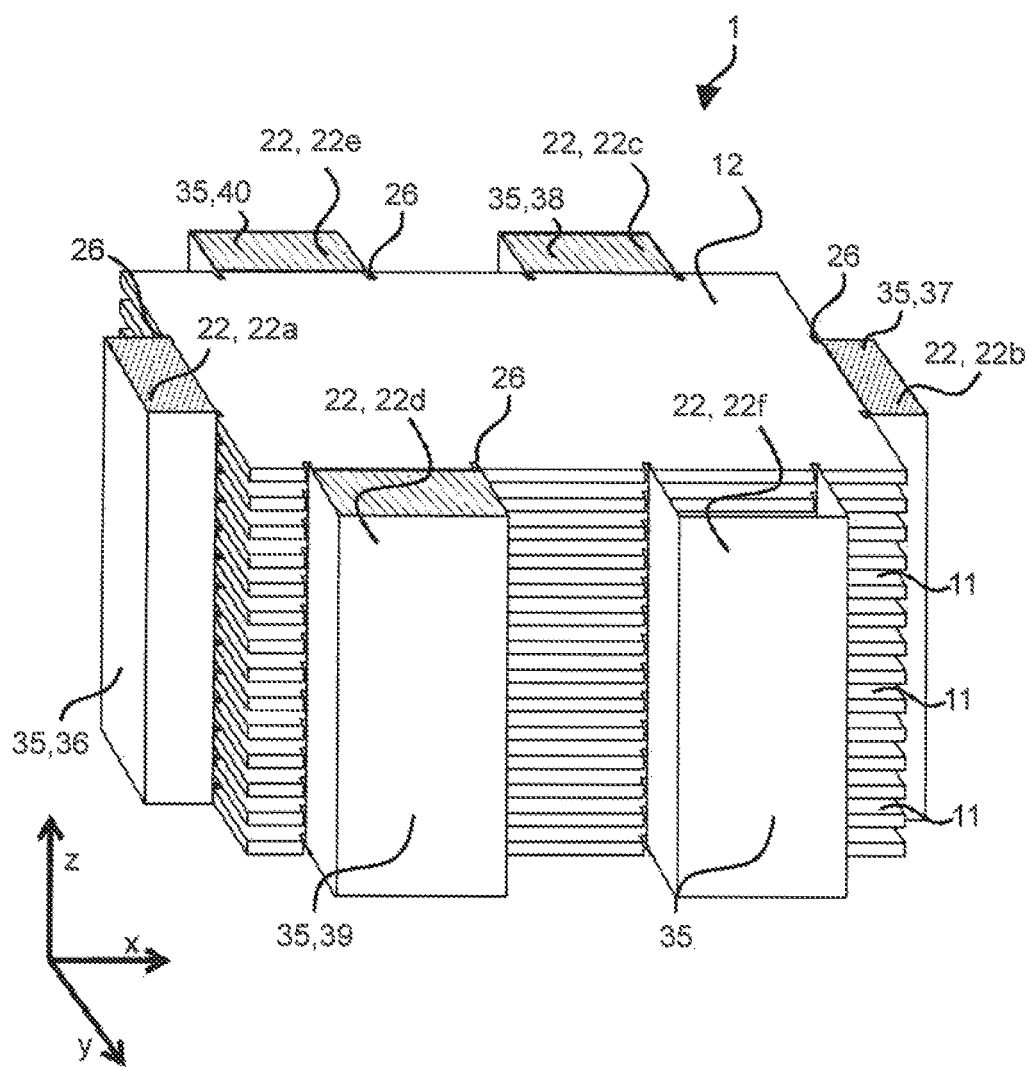
FIG. 1a shows a fuel cell device in a perspective view.
Figure 1B:
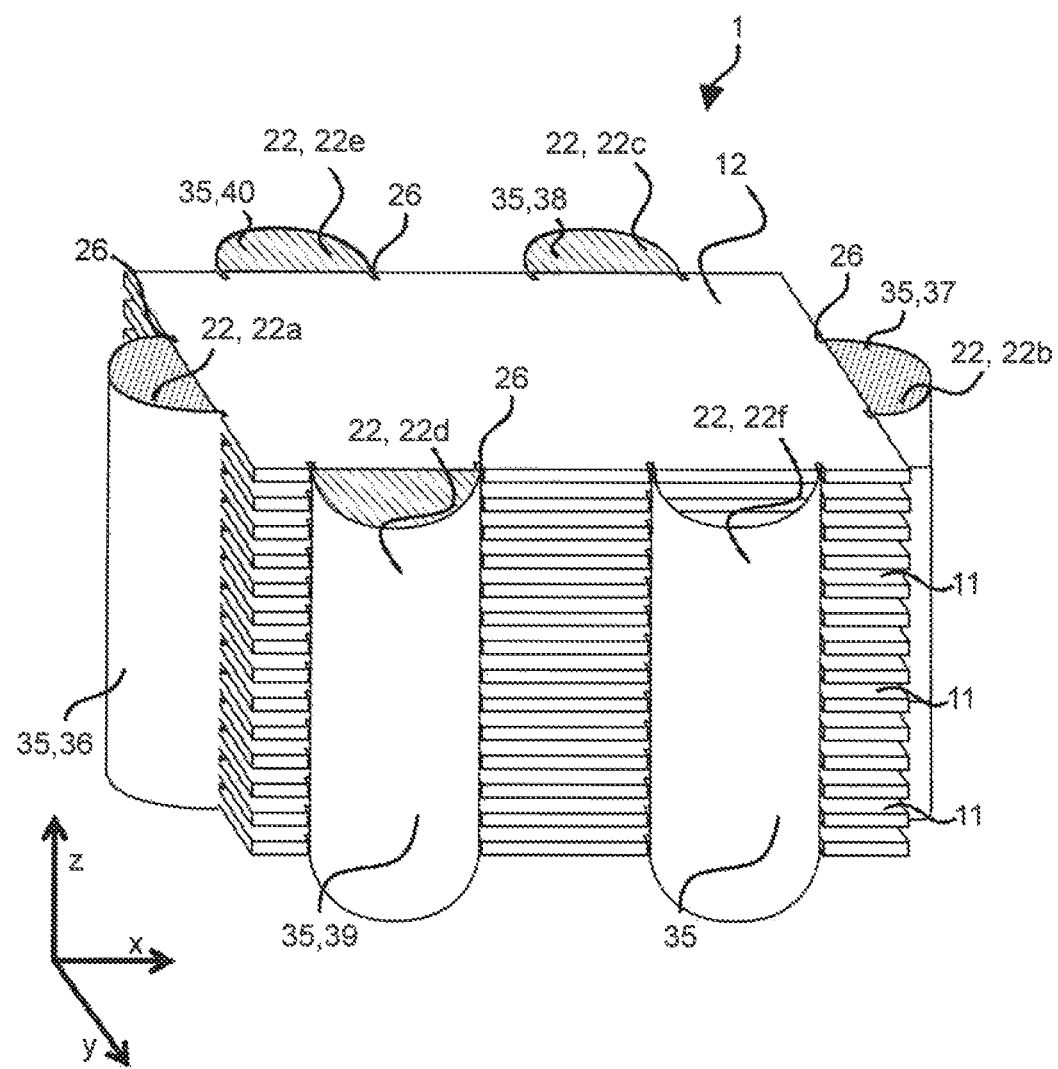
FIG. 1b shows another fuel cell device in a perspective view.

FIGS. 1a and 1b, respectively, show a fuel cell device 1 comprising a fuel cell stack 12. The fuel cell stack 12 is formed from a plurality of unit cells 11 stacked one above the other in a stacking direction (z direction). Each of the unit cells 11 has one or more media channels 8 (FIG. 2) and a membrane electrode assembly 2 (FIG. 6). Each of the membrane electrode assemblies 2 in the unit cells 11 comprises a cathode, an anode, and an ion-conductive membrane arranged between the cathode and the anode.

The fuel cell device 1 further comprises media ducts 22 running parallel to the stacking direction, which media ducts 22 are connected to the fuel cell stack 12 in such a way in order to conduct a medium substantially laterally to the stacking direction into or out of the media channels 8 of the unit cells 11 of the fuel cell stack 12. The present fuel cell device 1 comprises several media ducts 22 for this purpose, which are subdivided into a first media supply 22a on a first side of the fuel cell stack 12 for supplying a first reaction medium (e.g., oxygen or air) to the cathodes and into a first media discharge 22b on a second side of the fuel cell stack 12 opposite the first side for discharging the first reaction medium not consumed in the unit cells 11. In addition, the media ducts 22 are subdivided into a second reaction medium 22c on a third side of the fuel cell stack 12 for supplying a second reaction medium (e.g., fuel in the form of hydrogen) to the anodes and into a second media discharge 22d on a fourth side of the fuel cell stack 12 opposite the third side for discharging the second reaction medium not consumed in the unit cells 11. Ultimately, the media ducts 22 are also subdivided into a coolant supply 22e on the third side of the fuel cell stack 12 for supplying a coolant (e.g., liquid water) and into a coolant discharge 22f on the fourth side of the fuel cell stack 12 for discharging of partially heated coolant.

It can be seen from FIGS. 1a and 1b that the media ducts 22 themselves are functionalized, more precisely themselves are formed as a functional component 35. There is also the possibility that such a functional component 35 is integrated or introduced in cavities created by the media ducts 22.

In the present case, the first media supply 22*a* may be formed as a humidifier 36 in order to adjust the moisture content in the fuel cell stack 12 by humidification of the supply air.

In the present case, the first media discharge 22*b* may be formed as an air filter 37 in order to filter any contaminations.

In the present case, the second media supply 22*c* may be formed as a particle filter 38 in order to prevent a contamination of the fuel cell stack 12.

In the present case, the second media discharge 22*d* may be formed as a water separator 39 in order to collect condensate accumulating in the anode circuit. Moreover, in the present case, the coolant supply 22*e* may be formed as an ion exchanger 40 in order to lower the electrical conductivity of the coolant to be supplied to the fuel cell stack 12.

By way of example, the production or structure of the shown unit cells 11 of the fuel cell stack 12 is explained below with reference to FIGS. 2 to 11.

Figure 2:
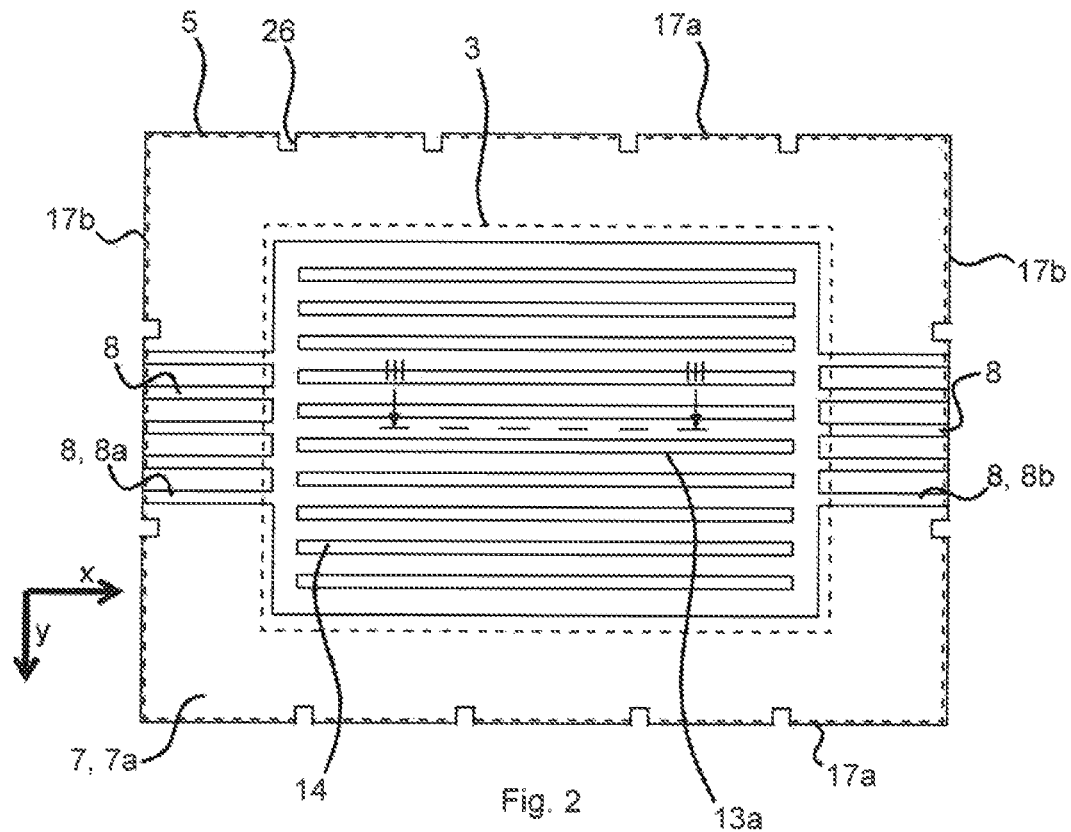
FIG. 2 shows a first bipolar plate of a unit cell in a plan view.

FIG. 2 shows a bipolar plate 7 of one of the unit cells 11. This first bipolar plate 7*a* has an inner active area 3, illustrated by dashed lines, and an outer edge area 5, illustrated by dashed lines. In the edge area 5, several media channels 8 are formed, which can be subdivided into the first media inlet channels 8*a*, illustrated on the left in the drawing, and the first media outlet channels 8*b*, illustrated on the right in the drawing. In the present case, a pair of flange receptacles 26 surrounding the media channels 8 is formed, discussed in detail below. Further flange receptacles 26 are formed on the long edges 17*a* of the bipolar plate 7.

In the present case, five of the first media inlet channels 8*a* and five of the first media outlet channels 8*b* are formed in the first bipolar plate 7*a*. Another number is possible. The first media inlet channels 8*a* are fluidly connected to the first media outlet channels 8*b* via a first flow field 13*a*. Said flow field 13*a* is located in the active area 3 and may provide a reaction medium to an adjacent membrane electrode assembly 2. In the example according to FIG. 2, the flow field 13*a* has several ducts or walls 14 for the uniform distribution of a reaction medium over the surface of the membrane electrode assembly 2. However, it is also possible, to use other types of flow-fields 13*a*, for example, those in which the flow of the reaction medium is conducted across the area of the active surface in the form of a meander. In addition, the distance of the walls 14, the wallings or crosspieces can vary. Also, the depth of the channel formed by adjacent walls 14 can be designed to be different and vary.

Figure 3:
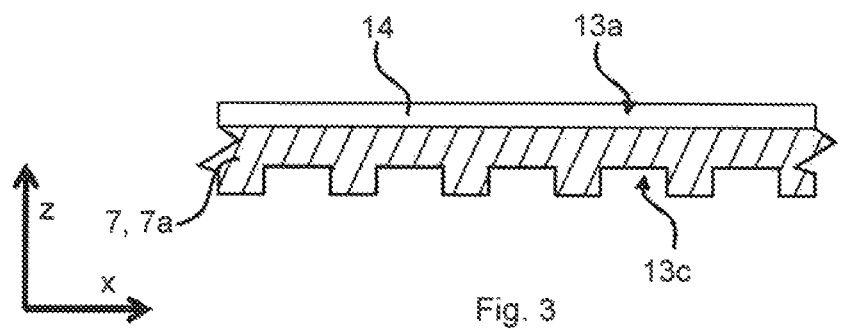
FIG. 3 shows section III-III of FIG. 2.

As is apparent from FIG. 3, the section III-III of FIG. 2, a flow field 13*c* is formed also on the side the first bipolar plate 7*a* facing away which the membrane electrode assembly 2, which flow field 13*c* allows flow of another medium, for example, a coolant.

As shown in FIG. 4, a composite layer 15, such as a joining layer is applied on the first bipolar plate 7*a* in the edge area 5. This composite layer 15 is formed in several parts or has recesses 16 in the area of the media channels 8*a*, 8*b*. The recesses 16 ensure that the media inlet channels 8*a* and the media outlet channels 8*b* are not sealed and subsequently allow conducting media through them.

The composite layer 15 attached in the edge area 5 extends along the long edge 17*a* of the first bipolar plate 7*a*, so that a flush finish to the edge area 5 that is predetermined by the dimensions of the bipolar plate 7 is formed. Areas for the flange receptacles 26 also remain free on the composite layer 15. This composite layer 15 is used to seal off the active surface or the active area 3 from the environment, wherein the choice of the material of the composite layer 15 is to be made to achieve this sealing function. In FIG. 5, the section V-V of FIG. 4, the flush finish of the composite layer 15 or the joining material with the bipolar plate 7 can be seen along its long edges 17*a*. The sections of the composite layer 15 which are located at the short edges 17*b*, are also flush with the bipolar plate 7. The selected illustration of the composite layer 15 is an example. It can be configured to be much thinner than the first bipolar plate 7*a*.

In FIG. 6, a fuel cell assembly comprising a membrane electrode assembly 2 was applied or placed onto the first bipolar plate 7*a* of FIG. 4 covered with the composite layer 15. The active area 3 is substantially predetermined by the dimensions of the membrane electrode assembly 2, which in turn is sketched in the figure by the inner dashed line. The active area 3 extends not only in a plane (x-y plane) but also in the stacking direction (z direction) which is oriented into or out of the paper plane.

The active area 3 is the area in which the electrochemical reaction of the fuel cell formed by the membrane electrode assembly 2 takes place. In the electrochemical reaction, a fuel (e.g., hydrogen) is conducted to the anode, where it is catalytically oxidized to form protons by releasing electrons. These protons are transported to the cathode through the ion exchange membrane. The electrons released from the fuel cell flow via an electrical load, such as to an electric motor for driving a vehicle, or to a battery. Then the electrons are conducted to the cathode. At the cathode, the oxidation medium (e.g., oxygen or air containing oxygen) is reduced to form anions by the absorption of electrons, which react directly with the protons to form water.

In order to ensure that the fuel reaches the anode directly or that the oxidation medium reaches the cathode directly, a sealing structure 4 is laterally assigned to the membrane electrode assembly 2 (FIGS. 6, 8). The combination of the membrane electrode assembly 2 and the sealing structure 4 in this case forms a common fuel cell assembly. Here, the sealing structure 4 comprises components that extend into the edge area 5, or even protrude beyond the edge area 5. These components are therefore arranged outside the active area 3. In other words, the edge area 5 delimits the active area 3 in the radial or lateral direction or circumferentially.

It can be seen in FIGS. 6 and 8 that the sealing structure 4 comprises a sealing tongue 6 extending into or beyond the edge area 5 to form an axial gas-tight covering of a media channel 8 formed in an adjacent bipolar plate 7 and located in the edge area 5. The fuel cell assembly shown here has a total of four sealing tongues 6. Two of the sealing tongues 6 are arranged opposite one another on the shorter edge 9*a* of the membrane electrode assembly 2. The other two sealing tongues 6 are arranged on the long edge 9*b* of the membrane electrode assembly 2 opposite one another and offset from one another. In the present case, the sealing tongues 6 all have a rectangular shape. However, polygonal shapes of the sealing tongues are possible, as are rounded sealing tongues 6.

The sealing structure 4 and the sealing tongues 6 are designed to be dimensionally stable with regard to a compressive and/or tensile stress acting axially on them. It can also be seen that the sealing tongues 6 extend beyond the edge area 5. However, it is also possible that one or more of the sealing tongues 6 only extend into the edge area 5, but not completely cover it or protrude laterally beyond it.

It can also be seen that the sealing structure 4 has a sealing edge 10 sealing the membrane electrode assembly 2 laterally. The sealing line formed by the sealing edge 10 seals the membrane electrode assembly 2 against the lateral escape of media.

The sealing tongue 6 of the fuel cell assembly on the left side covers the left media channels 8 of the first bipolar plate 7a axially in a gas-tight manner. The right sealing tongue 6 of the fuel cell assembly covers the right media channels 8 of the first bipolar plate 7a axially in a gastight manner. In other words, the left sealing tongue 6 is formed as a first inlet sealing tongue 6a for axially gas-tight covering of the first media inlet channel 8a on the left. Accordingly, the right sealing tongue 6 is formed as a first outlet sealing tongue 6b for an axial gas-tight covering of the right first media outlet channel 8b. The sealing tongues 6 provided at the long edge 17a of the bipolar plate 7a are resting on the composite layer 15. They can be subdivided into a second inlet sealing tongue 6c and a second outlet sealing tongue 6d.

A plastic or a plastic blend can be used as the material of the composite layer 15, which may have a lower thermal stability than the plastic or plastic blend of the sealing structure 4 or the sealing tongues 6. Thus, during a hot pressing process, the sealing tongues 6 can sink into the composite layer 15 and fuse with it, the sealing tongues 6 maintaining their dimensional stability. In other words, the melting point of the material of the sealing structure 4 is above the melting point of the material of the composite layer 15.

In the central area, that is to say where the active area 3 is located, the outer contour of the sealing structure 4 of the fuel cell assembly is adapted to the inner contour specified by the composite layer 15. Here, the portions free of sealing tongues of the sealing structure 4 form contact points, contact lines 18 or contact surfaces with the composite layer 15, to achieve a sealing function.

FIG. 7, section VII-VII of FIG. 6, shows a non-compressed sectional illustration of the partial unit cell 11. It can be seen that the first sealing tongues 6a, 6b protrude from the composite layer 15 and form protrusions 19 at the same. In doing so, the necessary sealing in the lateral direction is achieved. Here, too, the illustration selected is not to be understood to be true to scale. The thicknesses of the individual layers may vary, such as after a bonding operation or joining operation (e.g., hot pressing operation), after which it may appear or act as a single common layer. The area of the recess 16 located between the inlet sealing tongue 6a and the channels 8 is then minimized in such a way that the inlet sealing tongues 6a axially cover the channels 8. A medium can be supplied to the membrane electrode assembly 2 laterally and in the stacking direction below the first inlet sealing tongue 8a. Partially consumed medium can then leave the unit cell 11 of the fuel cell stack 12 laterally and in the stacking direction below the first outlet sealing tongue 8b.

In FIG. 8, a connecting layer 20 is applied to the first inlet sealing tongue 6a and to the first outlet sealing tongue 6b, which is to be understood to be a further joining layer. The composite layer 15 and the connecting layer 20 ensure a secure connection between a first bipolar plate 7a and a second bipolar plate 7b in the stacking direction. The composite layer 15 forms overlaps 21 with the connecting layer 20 in such a way that the two layers have a contact surface in the stacking direction. This ensures a sealing function. The overlaps 21 can be seen in more detail in FIG. 9, section IX-IX of FIG. 8. Here also, it shows a non-compressed state, not to scale, which is intended to clarify the stacked assembly of the individual layers.

A second bipolar plate 7b can now be applied to the composite layer 15 and the connecting layer 20 connected thereto to complete the unit cell 11. This can be seen in FIG. 10. The first bipolar plate 7a and the second bipolar plate 7b can be joined by means of the joining layers in such a way that a unit cell 11 made of first bipolar plate 7a, the fuel cell assembly and second bipolar plate 7b is formed and that is provided with not more than slight protrusions. However, the individual layers of the unit cell 11 are connected without edges or without offset in the stacking direction.

Figure 10:
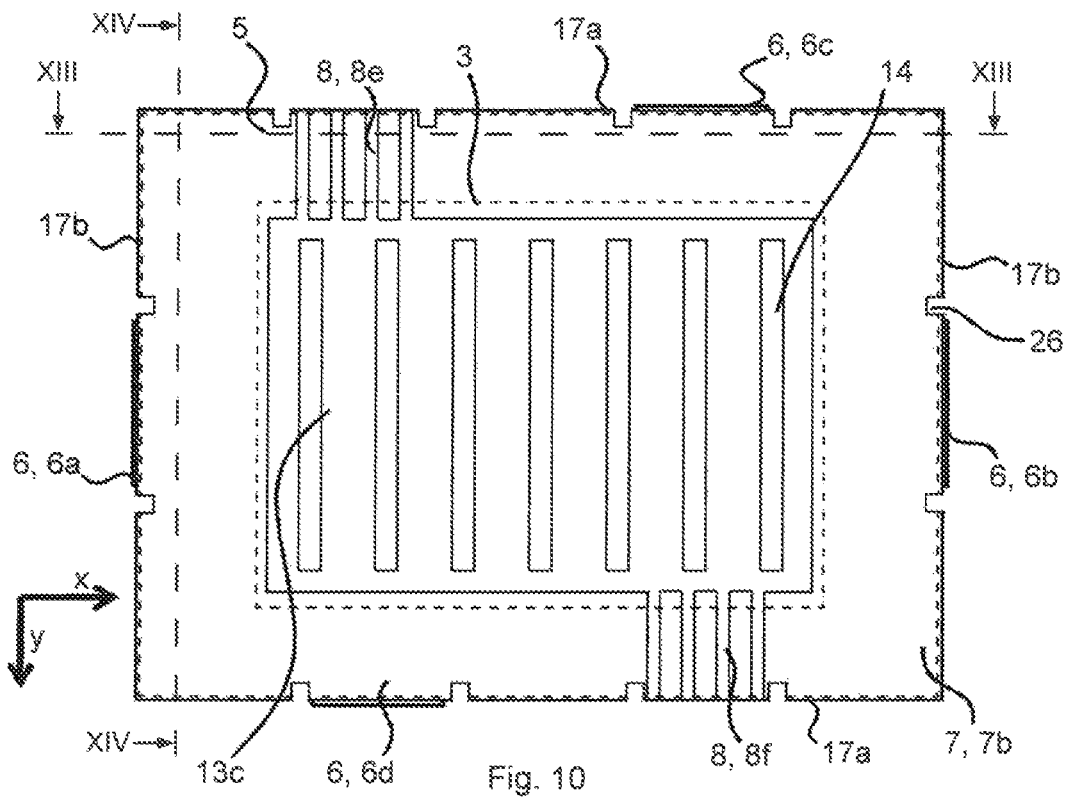
FIG. 10 shows a unit cell of the fuel cell stack with a second bipolar plate, shown in a plan view.
Figure 11:
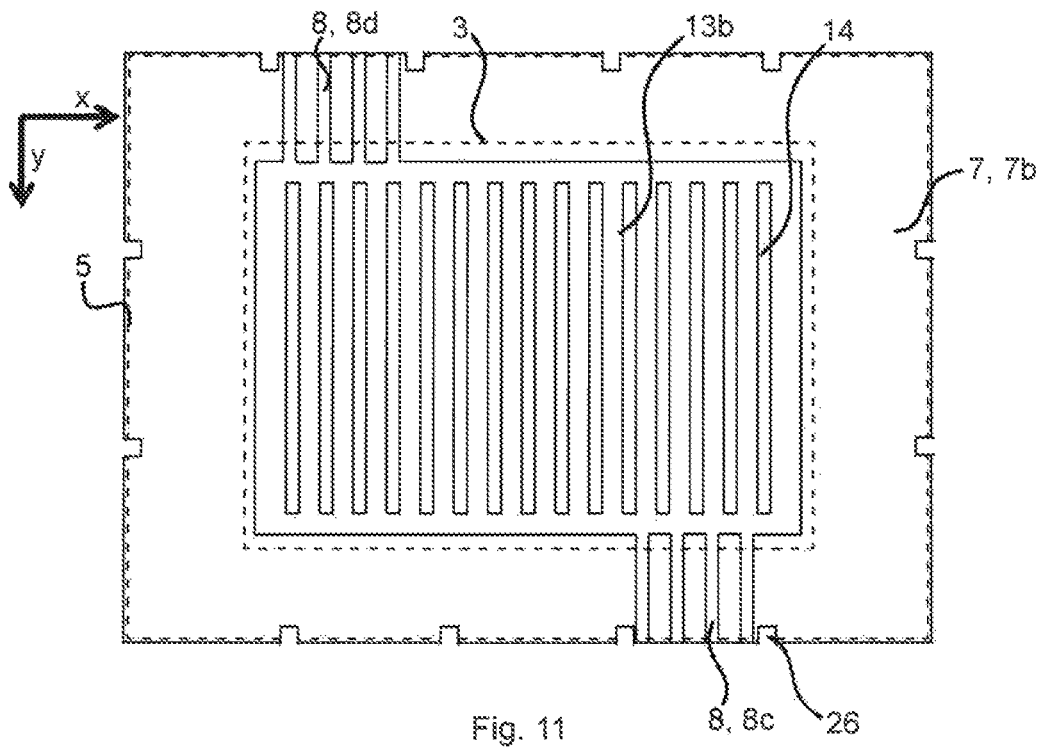
FIG. 11 shows the second bipolar plate in a bottom view, i.e., in a view of the surface of the second bipolar plate facing the membrane electrode assembly.

Like the first bipolar plate 7a, second bipolar plate 7b shown in FIG. 10 and FIG. 11, also has a flow field 13c for conducting a cooling medium on its side facing away from the membrane electrode assembly 2. Said flow field 13c is located substantially in the active area 3. It is fluidly connected with coolant inlet channels 8e and with coolant outlet channels 8f. In addition, the second bipolar plate 7b also includes recessed areas which form the flange receptacles 26.

However, at its side facing the membrane electrode assembly 2, the second bipolar plate 7b has one or more second media outlet channels 8c and one or more second media outlet channels 8d (FIG. 11). It also comprises a second flow field 13b that is fluidly connected to the second media inlet channel 8c and to the second medium outlet channel 8d, through which one of the reaction media can be supplied to the membrane electrode assembly 2.

Figure 12:
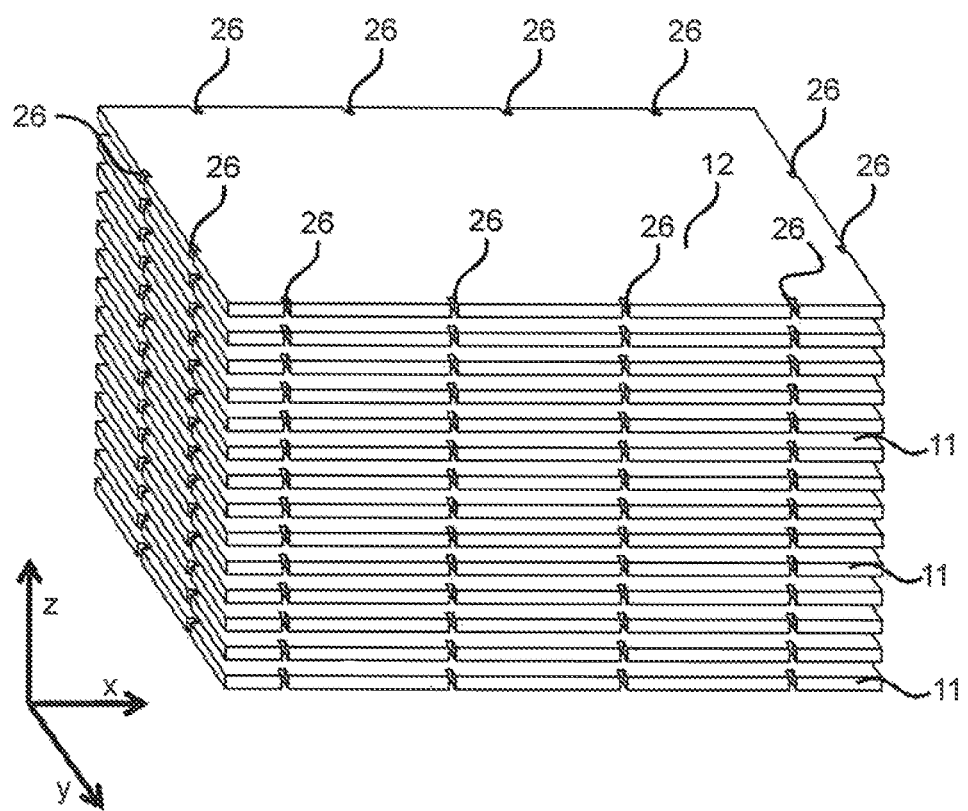
FIG. 12 shows a fuel cell stack formed of several unit cells according to FIG. 10 in a perspective view.

FIG. 12 illustrates a fuel cell stack 12 formed of several unit cells 11. This fuel cell stack 12 has the advantage, that the bipolar plate 7, compared to known bipolar plates, can be configured to have smaller dimensions so that the manufacturing costs of the fuel cell stack 12 are reduced. In the present case, the bipolar plates 7 are basically rectangular in shape, the present fuel cell devices not only being dependent on a rectangular shape of the bipolar plates 7, but can also be used without limitation in any shapes with, for example, round or curved lines. It is important in this context that a plurality of flange receptacles 26 formed to be running parallel to the stacking direction arm is present at the fuel cell stack 12 at which flange receptacles 26 the media ducts 22 can be fixed 22.

Figure 13:
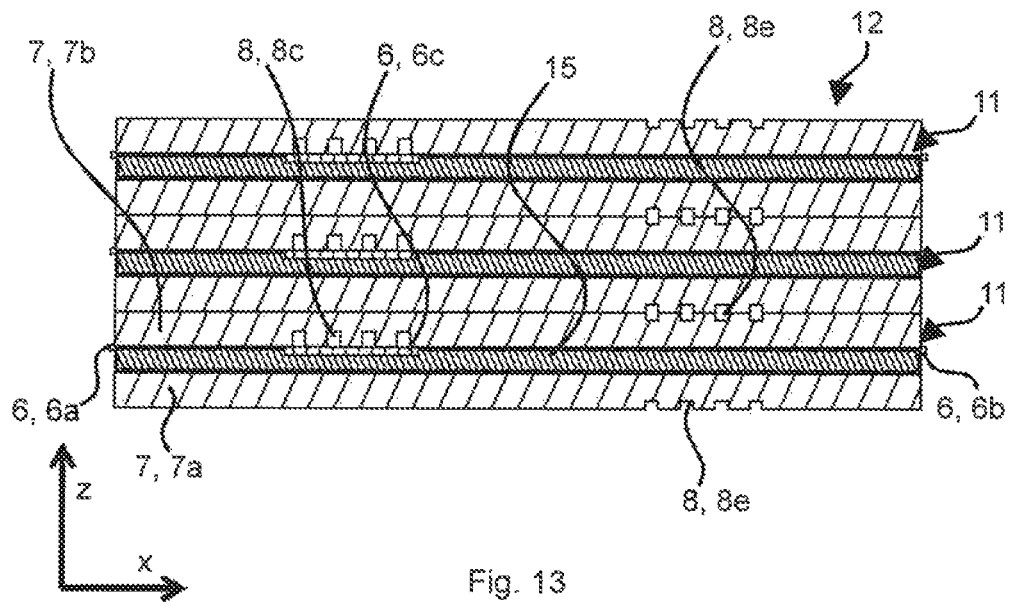
FIG. 13 shows sectional view XIII-XIII of FIG. 10 by a plurality of unit cells stacked one above the other with the components in a compressed state.

FIG. 13 shows a sectional view taken along section XIII-XIII of FIG. 10 through a fuel cell stack 12. It can be seen that, after the joining or hot pressing operation, the compound layer 15 touches or contacts both the first bipolar plate 7a and the second bipolar plate 7b, wherein the bipolar plates 7 are connected or joined to each other by the composite layer 15. It can also be seen that the second media inlet channels 8c are covered axially in a gas-tight manner by the second inlet sealing tongues 6c extending into or over the edge area 5. This also applies to the second bipolar plate 7b on the opposite side, where second outlet sealing tongues 6d extending into or beyond the edge area 5 are provided for covering the second media outlet channels 8c axially in a gas-tight manner. In FIG. 13 it can also be seen that a second reaction medium is conducted to the membrane electrode assembly 2 laterally and in the stacking direction above the sealing structure 4. Accordingly, the partially consumed second reaction medium is also conducted in the stacking direction above the sealing structure 4 laterally out of the unit cells 11 or out of the fuel cell stack 12.

The second bipolar plate 7b of a first unit cell 11, together with a first bipolar plate 7a of a further unit cell 11, then forms the complete channel cross section for the passage of the cooling medium. In other words, they then also form the coolant inlet channels 8e and the coolant outlet channels 8f. The second bipolar plate 7b of the first unit cell 11 and the first bipolar plate 7a of the further unit cell 11 can also be joined with each other with a joining agent or joining medium. Alternatively, a generatively manufactured integral configuration of the adjacent bipolar plates 7 is possible.

Figure 14:
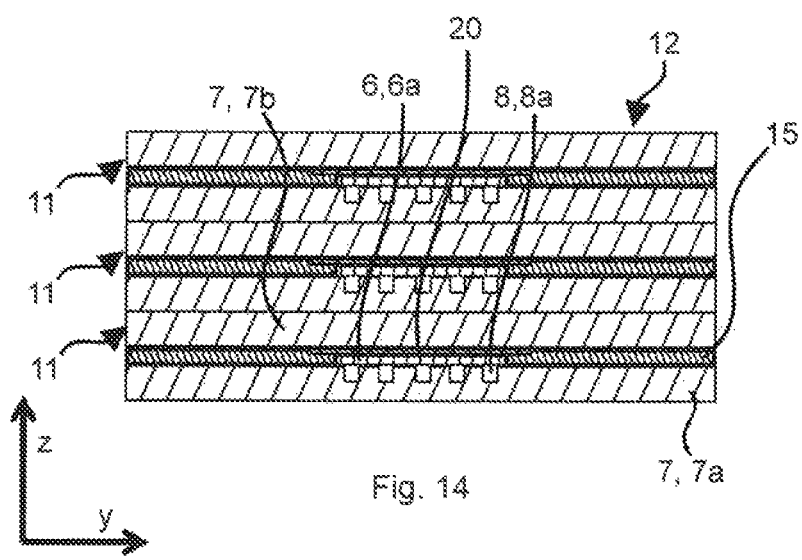
FIG. 14 shows sectional view XIV-XIV of FIG. 10 through a plurality of unit cells stacked one above the other with the components in a compressed state.

FIG. 14 shows a sectional view taken along section XIV-XIV of FIG. 10 through a fuel cell stack 12. It can be seen that, in the stacking direction, the second bipolar plate 7a is applied to the connecting layer 20 and the composite layer 15. It can also be seen that a first reaction medium is conducted to the membrane electrode assembly 2 in the stacking direction below the sealing structure 4. In this case, the first media inlet channels 8a are covered axially in a gas-tight manner by the first inlet sealing tongues 6a. A first reaction medium is supplied laterally or in a lateral direction with respect to the stacking direction. Correspondingly, the partially consumed first reaction medium is also conducted out laterally or sideward from the unit cell 11 or from the fuel cell stack 12 in the stacking direction below the sealing structure 4.

Figure 15:
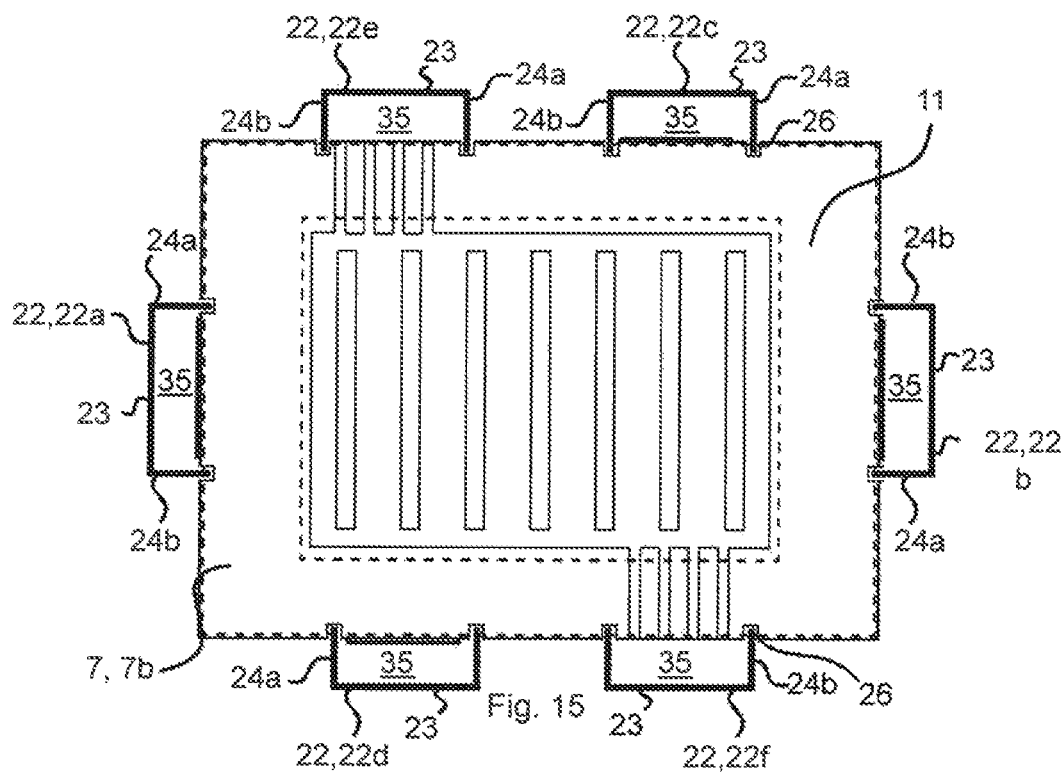
FIG. 15 shows a cross section running perpendicular to the stacking direction through the fuel cell stack of FIG. 1a with media ducts attached to it.

FIG. 15 shows a sectional view through the fuel cell device 1 according to FIG. 1b, which substantially corresponds to the plan view of the unit cells 11 according to FIG. 10. It can be seen that the media ducts 22 formed as a functional component 35 with their duct flanges 24a, 24b are now inserted into the flange receptacles 26.

The media ducts 22 shown here have a duct crosspiece 23 which connects the two terminal duct flanges 24a, 24b with each other. Each of the duct flanges 24a, 24b is received in one of the flange receptacles 26 extending parallel to the stacking direction, of the fuel cell stack 12. The open side of the media ducts 22 faces the fuel cell stack 12, so that a medium flowing through them can laterally enter the unit cells 12. The media ducts 22 are substantially rectangular in cross section, however, a different shape is possible. The media channels 22 may be formed from a dimensionally stable, plastic.

Figure 16:
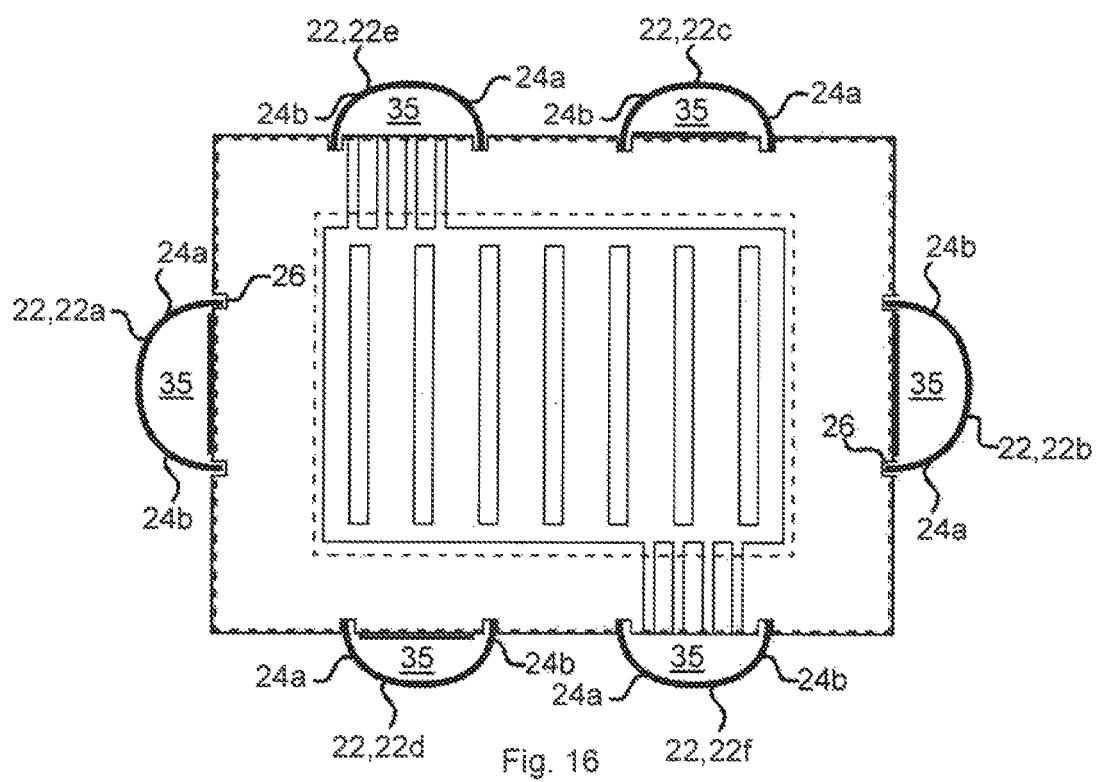
FIG. 16 shows a cross section running perpendicular to the stacking direction through the fuel cell device of FIG. 1b.

FIG. 16 shows a different shape of the media ducts 22 formed as a functional component 35, a cross section through the fuel cell stack 12 of FIG. 1b being shown here. Here, the media ducts 22 are formed to be semi-circular or C-shaped, so that the duct flanges 24a, 24b are connected directly to each other, dispensing with a duct crosspiece 23.

Figure 17:
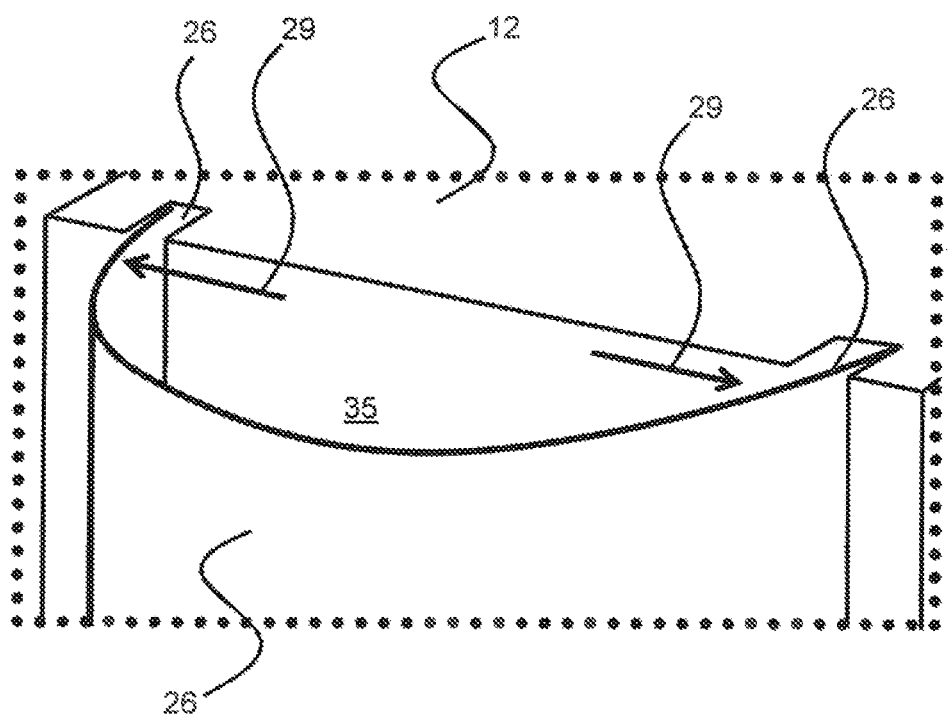
FIG. 17 shows a perspective detailed view of the fuel cell device according to FIG. 1b.

From the detailed view according to FIG. 17 it can be seen that, in the present case, the media ducts 22 are formed to be elastically resilient. In doing so, the duct flanges 24a, 24b are held in an outwardly directed pre-load in the flange receptacles 26 of the fuel cell stack 12. A restoring force (indicated by force arrows 29) is effective and the media ducts 22 are secured within the flange receptacles 26 due to this restoring force. In addition, the duct flanges 24a, 24b are additionally secured due to the pressure of a medium flowing in the media ducts 22. This medium also brings about an outwardly directed force, which—added together with the restoring force—lead to an even stronger connection between the media ducts 22 and the fuel cell stack 12.

Figure 18:
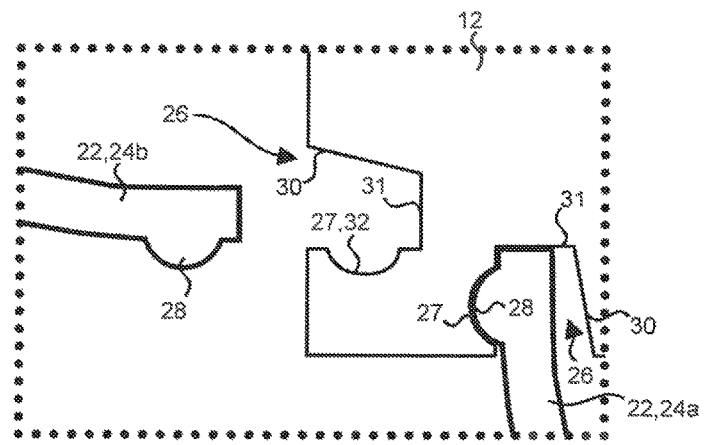
FIG. 18 shows a detailed view of the flange receptacle and the end of a duct flange.

Alternatively or in addition, the flange receptacles 26 can also be formed in accordance with the detail shown in FIG. 18. Here, the flange receptacles 26 have an undercut 27 in which a duct member 28 formed or arranged on the duct flange 24a, 24b can be received. Within the flange receptacle 26—opposite the undercut 27—an inclined insertion surface 30 is formed, which facilitates the insertion of the duct flange 24a, 24b into the flange receptacle 26. The insertion surface 30 is inclined both with respect to the long edge 17a and with respect to the short edge 17b of the bipolar plate 7. The insertion surface 30 changes to a lateral contact surface 31 which is oriented parallel to the plate edge and which predetermines and/or limits the depth of penetration of the duct flanges 24a, 24b into the flange receptacle 26. Starting from the contact surface 31, flange receptacle 26 then changes to a groove-shaped contact surface 32 forming the undercut 27.

Figure 19:
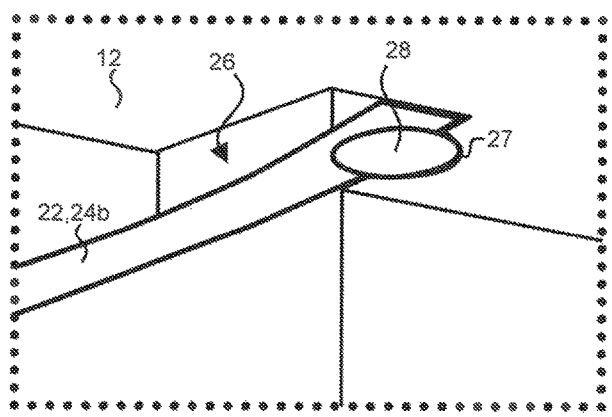
FIG. 19 shows another detailed view of the flange receptacle with duct flanges inserted therein.

While in the example of FIG. 17, the duct member 28 is formed integrally with the duct flange 24a, 24b, the duct member 28 is shaped of a different material than the duct flange 24a, 24b in the example of FIG. 19. This other material can, for example, be an additional sealing material in order to additionally ensure the leakproofness of the fuel cell stack 12.

The present configuration of the fuel cell device 1 allows a positionally accurate assembly of the media ducts 22 on the fuel cell stack 12. The fixing of the duct flanges 24a, 24b within the flange receptacles 26 of the fuel cell stack 12 by means of the force-fitting and/or firmly bonded and/or interlocking coupling withstands a large force directed away from the fuel cell stack 12, which force is exerted by pressure of the media flowing in media ducts 22. The media ducts 22 are characterized by their excellent self-locking function, wherein the production complexity is reduced due to the integration of the functional component 35.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell device, comprising:
a fuel cell stack including a plurality of unit cells stacked one above the other in a stacking direction, each unit cell having one or more media channels and a membrane electrode assembly that comprises a cathode, an anode, and a membrane arranged between the cathode and the anode; and
a media duct running substantially parallel to the stacking direction, which media duct is connected or can be connected to the fuel cell stack in order to conduct a medium into or out of the media channels of the unit cells of the fuel cell stack substantially laterally to the stacking direction,
wherein the media duct is formed as a functional component or such a functional component is integrated therein, which is designed to pre-treat the medium before the medium enters the media channels or to post-treat the medium after the medium has exited the media channels,
wherein the fuel cell stack has flange receptacles which are formed to receive in each case a duct flange of the media duct, and
wherein the media duct is elastically resilient in such a way that the duct flanges are held under a pre-load in the flange receptacles in a self-locking manner.

2. The fuel cell device according to claim 1, wherein the functional component is selected from the group consisting of: a humidifier, an ion exchanger, an ion trap, a particle filter, an air filter, and a water separator.

3. The fuel cell device according to claim 1, wherein several media ducts are provided, wherein the media ducts are formed as a first media supply for supplying air, as a first media discharge for discharging at least partially consumed air, as a second media supply for supplying a fuel, and as a second media discharge for discharging at least partially consumed fuel.

4. The fuel cell device according to claim 3, wherein the first media supply is formed as a humidifier or such a humidifier is integrated therein.

5. The fuel cell device according to claim 3, wherein the first media discharge is formed as an air filter or such an air filter is integrated therein.

6. The fuel cell device according to claim 3, wherein the second media supply is formed as a particle filter or such a particle filter is integrated therein.

7. The fuel cell device according to claim 3, wherein the second media discharge is formed as a water separator or such a water separator is integrated therein.

8. The fuel cell device according to claim 3, wherein the media ducts are subdivided into a coolant supply and a coolant discharge.

9. The fuel cell device according to claim 8, wherein the coolant supply is formed as an ion exchanger or such an ion exchanger is integrated therein.

\* \* \* \* \*